United States Patent
Schneider et al.

(10) Patent No.: US 9,963,595 B2
(45) Date of Patent: May 8, 2018

(54) COATING COMPOSITION AND METHOD FOR PRODUCING POWDER COATING

(75) Inventors: Mike Schneider, Langenbach (DE); Phu Qui Nguyen, Moenchengladbach (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1054 days.

(21) Appl. No.: 14/117,403

(22) PCT Filed: May 18, 2012
(Under 37 CFR 1.47)

(86) PCT No.: PCT/US2012/038618
§ 371 (c)(1),
(2), (4) Date: Dec. 18, 2014

(87) PCT Pub. No.: WO2012/159049
PCT Pub. Date: Nov. 22, 2012

(65) Prior Publication Data
US 2015/0203690 A1    Jul. 23, 2015

Related U.S. Application Data

(60) Provisional application No. 61/487,310, filed on May 18, 2011, provisional application No. 61/487,311, filed on May 18, 2011.

(51) Int. Cl.
*C09D 5/03* (2006.01)
*C09D 133/14* (2006.01)
(Continued)

(52) U.S. Cl.
CPC ............ *C09D 5/033* (2013.01); *B05D 1/007* (2013.01); *B05D 1/06* (2013.01); *B05D 1/10* (2013.01); *B05D 1/12* (2013.01); *B05D 3/002* (2013.01); *B05D 3/0263* (2013.01); *B05D 3/0272* (2013.01); *B05D 3/04* (2013.01); *B05D 3/0406* (2013.01); *B05D 3/0413* (2013.01); *B05D 3/065* (2013.01); *B05D 3/067* (2013.01); *B05D 7/14* (2013.01); *B05D 7/16* (2013.01); *B05D 7/26* (2013.01); *B05D 7/53* (2013.01); *B05D 7/536* (2013.01); *B05D 7/5323* (2013.01); *B05D 7/54* (2013.01); *B05D 7/542* (2013.01); *B05D 7/546* (2013.01); *B05D 7/556* (2013.01); *B05D 7/572* (2013.01); *B05D 7/576* (2013.01); *B05D 7/58* (2013.01); *B05D 7/582* (2013.01); *B05D 7/586* (2013.01); *C09D 5/03* (2013.01); *C09D 5/032* (2013.01); *C09D 5/035* (2013.01); *C09D 5/036* (2013.01); *C09D 5/037* (2013.01); *C09D 5/038* (2013.01); *C09D 7/12* (2013.01); *C09D 7/1208* (2013.01); *C09D 7/1216* (2013.01); *C09D 7/1225* (2013.01); *C09D 7/1233* (2013.01); *C09D 133/14* (2013.01); *B05D 2202/00* (2013.01); *B05D 2350/60* (2013.01); *B05D 2401/32* (2013.01); *B05D 2502/005* (2013.01);
(Continued)

(58) Field of Classification Search
CPC .... C08K 3/22; C08K 2003/2227; C09D 5/03; C09D 5/032; C09D 5/033; C09D 5/035; C09D 5/036; C09D 5/037; C09D 5/038; C09D 7/12; C09D 7/1208; C09D 7/1216; C09D 7/1225; C09D 7/1233; C09D 7/26; C09D 7/53; C09D 7/5323; C09D 7/536; C09D 7/54; C09D 7/542; C09D 7/546; C09D 7/56; C09D 7/572; C09D 7/576; C09D 7/58; C09D 7/582; C09D 7/586; C09D 2202/00; C09D 2350/60; C09D 2401/32; C09D 2502/00; C09D 2502/005; C09D 2503/00; C09D 2601/25
USPC .......................................... 427/331; 523/440
See application file for complete search history.

(56) References Cited

U.S. PATENT DOCUMENTS 5,266,652 A * 11/1993 Toyoda .............. C08G 59/3218
                                                    525/327.3
5,472,649 A    12/1995 Chang et al.
(Continued)

FOREIGN PATENT DOCUMENTS

| EP | 1 396 519 A1 * | 10/2004 |
| EP | 1924655 B1 | 5/2011 |
| WO | 03102089 A1 | 12/2003 |

OTHER PUBLICATIONS

ISA European Patent Office, International Search Report for Application No. PCT/US2012/038618, dated Aug. 22, 2012.
(Continued)

*Primary Examiner* — William P Fletcher, III
(74) *Attorney, Agent, or Firm* — Lorenz & Kopf LLP

(57) ABSTRACT

A powder coating composition is provided herein. The powder coating composition includes a glycidyl-functionalized (meth)acrylic resin as a film-forming binder, a cross-linking agent (hardener) for the binder, particles chosen from the group comprising aluminum oxide $Al_2O_3$ and aluminum hydroxide $Al(OH)_3$ particles, and a coating additive, the wt % based on the total weight of the powder coating composition. A process for the production of a scratch resistant powder coating is also provided herein. The process includes the steps of a) applying a transparent clear coat or a pigmented top coat directly onto a substrate surface or onto a prior coating, and b) curing the clear coat or the top coat applied in step a) wherein the transparent clear coat or the pigmented top coat includes the powder coating composition.

13 Claims, No Drawings

(51) Int. Cl.
*C08K 3/22* (2006.01)
*B05D 1/00* (2006.01)
*B05D 3/00* (2006.01)
*B05D 7/00* (2006.01)
*B05D 1/06* (2006.01)
*B05D 1/12* (2006.01)
*B05D 1/10* (2006.01)
*B05D 3/06* (2006.01)
*B05D 3/04* (2006.01)
*B05D 3/02* (2006.01)
*B05D 7/16* (2006.01)
*B05D 7/26* (2006.01)
*B05D 7/14* (2006.01)
*C09D 7/12* (2006.01)

(52) U.S. Cl.
CPC ...... *B05D 2503/00* (2013.01); *B05D 2601/28* (2013.01); *C08K 3/22* (2013.01); *C08K 2003/2227* (2013.01)

(56) References Cited

U.S. PATENT DOCUMENTS

| | | | |
|---|---|---|---|
| 6,750,270 | B1 | 6/2004 | Klostermann et al. |
| 6,908,692 | B1 | 6/2005 | Boehm et al. |
| 7,563,317 | B2 | 7/2009 | Meyer et al. |
| 8,043,701 | B2 | 10/2011 | Edelmann et al. |
| 2003/0100678 | A1 | 5/2003 | Nicoll et al. |
| 2006/0084723 | A1 | 4/2006 | Hartwig et al. |
| 2007/0251420 | A1* | 11/2007 | Bolm ............... C09D 5/033 106/287.17 |

OTHER PUBLICATIONS

ISA European Patent Office, International Preliminary Report on Patentability for International Application No. PCT/US2012/038618, dated Nov. 28, 2013.

* cited by examiner

US 9,963,595 B2

COATING COMPOSITION AND METHOD FOR PRODUCING POWDER COATING

CROSS-REFERENCE TO RELATED APPLICATION

This application is a U.S. National-Stage entry under 35 U.S.C. § 371 based on International Application No. PCT/US2012/038618, filed May 18, 2012 which was published under PCT Article 21(2) and which claims priority to U.S. Application No. 61/487,310, filed May 18, 2011, and to U.S. Application No. 61/487,311, filed May 18, 2011, which are all hereby incorporated in their entirety by reference.

TECHNICAL FIELD

The present invention is directed to a powder coating composition providing coatings having low pollution tendency and improved scratch resistance. This invention is also related to a process for the production of a powder coating wherein the coating is produced from a powder coating composition comprising specific particles.

BACKGROUND

In certain applications, it is desirable for powder coatings to have a surface that is smooth in appearance and has a high scratch resistance. Known is the use of wax agents to adjust the scratch resistance to the desired level. Examples for such waxes are hydrocarbon and fluorocarbon waxes. Such compositions often lead to coatings with a loss in technological properties, for example, reducing the gloss of the powder coatings. As a wax-containing coating is baked, the wax migrates to the coating/air interface where it forms a layer with reduced gloss. Shortcomings of this approach are that the wax may soften the coating surface and reduce its resistance to marring, staining and chemical attack. Furthermore, it is possible that the migrated wax will partially be washed from the coated surface.

It is known to improve the above-stated properties by incorporating hard particles into powder coating compositions. Such particles often cause undesired effect such as insufficient gloss and transparency of clear coatings.

Alternatively, nano-scaled particles having an average particles size in the range of below 100 nm can be used in clear or top coats. EP-A 1216278, EP-A 1195416 and DE-A 10239424 describe differently structured and functionalised nano-scaled particles and the use thereof in coatings to impart scratch resistance. Further, WO 03102089, DE-A 10241510, EP-A 1166283 and EP-A 1924655 disclose chemically modified nano-scaled particles, which can be congregated at the surface of the coatings, can be incorporated into the unsaturated monomers forming the binder, or can be particles based on an element-oxygen network with reactive and optionally, un-reactive functions on their surface. The nano-scaled particles need to be incorporated into the coatings without any undesired effect to the general range of properties such as optical quality, rheology, flow and adhesion, and they can have insufficient hardness and/or can cause also insufficient transparency of clear coatings.

Therefore, there is still a requirement to provide coatings with improved scratch resistance, without causing any undesired effect to the general range of properties of the coatings. In addition, other objects, desirable features and characteristics will become apparent from the subsequent summary and detailed description, and the appended claims, taken in conjunction with the accompanying drawings and this background.

SUMMARY

The present invention provides a powder coating composition comprising
  A) about 30 to about 90 wt % of a glycidyl-functionalised (meth)acrylic resin as a film-forming binder,
  B) about 30 to about 90 wt % of a cross-linking agent (hardener) for the binder,
  C) about 0.01 to about 20 wt % of particles chosen from the group comprising aluminium oxide $Al_2O_3$ and aluminium hydroxide $Al(OH)_3$ particles having an average particles size in the range of about 0.1 to about 10 µm, and
  D) about 0.05 to about 50 wt % of a coating additive, and optionally, a pigment and/or a filler,
  the wt % based on the total weight of the powder coating composition.

The powder coating composition of this invention provides coatings with improved smoothness and high scratch resistance, without any use of waxes, and improved effect of low pollution tendency. It has surprisingly been found, by using the particles C) having the average particles size in the range of about 0.1 to about 10 µm, in combination with components A) and B) of the present invention, that gloss and transparency of clear coatings can be achieved with high quality. Further, the adhesion property on metallic substrates, for example aluminium substrates, remains unaffected. The compositions of this invention are especially suitable for outdoor coatings.

The present invention also provides a process for the production of a scratch resistant powder coating, comprising the steps;
  a) applying a transparent clear coat or a pigmented top coat directly onto a substrate surface or onto a prior coating, and
  b) curing the clear coat or the top coat applied in step a) wherein the transparent clear coat or pigmented top coat comprises the powder coating composition described above.

The process for the production of the powder coating of this invention provides coatings with improved smoothness and high scratch resistance, without any use of waxes, and improved effect of low pollution tendency. It has surprisingly been found by the process according to the invention that gloss and transparency of clear coatings can be achieved with high quality. Further, the adhesion property on metallic substrates, for example aluminium substrates, remains unaffected. The process according to the invention is especially suitable for outdoor coatings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The powder coating composition of this invention comprises, preferably consists of, about 0.01 to about 20 wt %, preferably about 0.1 to about 15 wt %, the wt % based on the total weight of the powder coating composition, particles selected from the group consisting of aluminium oxide Al2O3 and aluminium hydroxide Al(OH)3 particles as component C) wherein the particles have an average particles size in the range of about 0.1 to about 10 μm. Preferably, the particles of component C) have an average particle size in the range of 1 to 10 μm, particularly preferred from about 5 to about 10 μm, and most preferred from about 8 to about 10 μm.

Preferably the particles of component C) have a spherical shape.

The term average particles size stated in the present description refers to the measurement with a Malvern Zeta-sizer according to ISO 13321, 21 CFR Part 11.

The particles of component C) of the invention can be surface-treated as known in the art, for example, can be silicone modified particles.

Also, in accordance with this invention, it is possible to use the particles of the invention in mixture with particles based on one or more oxides containing elements such as silicon, zinc, magnesium, titanium, zirconium, tin, boron, germanium, gallium, lead, the transition metals, the lanthanides and/or actinides, preferably silicon, zinc, magnesium, titanium and/or cerium, for example, SiO2, ZnO, TiO2, SnO2, wherein those particles can have an average particle size in a range of about 0.01 to about 10 μm, particularly about 0.1 to about 5 μm.

Also, the particles of the invention can be used in mixture with particles based on one or more mixed oxides, the mixed oxides as such known in the art, for example, Al2O3TiO2, Al2O3SnO2, AlCeO3, MgAl2O4, wherein those particles can have an average particle size in a range of about 0.01 to about 10 μm, particularly about 0.1 to about 5 μm.

The other oxides and/or mixed oxides can be used in a range of 0 to about 5 wt %, preferably about 0.01 to about 1 wt %, the wt % based on the total weight of the powder coating composition.

Preferred is the use of aluminium hydroxide Al(OH)3 particles according to the invention, without any surface-treatment of the particles.

The powder coating composition of this invention comprises, preferably consists of, one or more glycidyl-functionalised (meth)acrylic resins A) as the film-forming binder of the coating composition of the invention, with quantities in the range of about 30 to about 90 wt %, preferred in the range of about 40 to about 70 wt %, the wt % based on the total weight of the powder coating composition.

(Meth)acrylic is respectively intended to mean acrylic and/or methacrylic.

The glycidyl-functionalised (meth)acrylic resins may be produced in a conventional manner from glycidyl monomers, as is, for example, described in D. A. Bates, The Science of Powder Coatings, volumes 1 & 2, Gardiner House, London, 1990, pages 62-70, and as known by the person skilled in the art.

The glycidyl-functionalised (meth)acrylic resin A) may be produced from monomers selected from the group consisting of glycidyl monomers and co-monomers such as (meth)acrylic acid esters, hydroxyl functionalised (meth) acrylic acid esters together with styrene derivatives and/or vinyltoluene. Examples of glycidyl monomers are glycidyl (meth)acrylate, epoxycyclopentyl (meth)acrylate, (meth)allylglycidyl ether, epoxyvinylcyclohexane. Examples of co-monomers are methyl (meth)acrylate, ethyl (meth)acrylate, butyl (meth)acrylate, isobutyl (meth)acrylate, hexyl (meth) acrylate, ethylhexyl (meth)acrylate, cyclohexyl (meth)acrylate, lauryl (meth)acrylate, hydroxyethyl and hydroxypropyl (meth)acrylic acid esters, styrene, methyl styrene, butyl styrene. Preferred are the monomers glycidyl (meth)acrylate, (meth)acrylic acid esters and styrene derivatives.

The glycidyl-functionalised (meth)acrylic resins have an epoxide equivalent weight (EEW) in a range of about 300 to about 2000, epoxy equivalent weight determined by means of ADSAM142, a method code of the EEW test using auto-tritator (Brinkman Metrohm 751 GPD Titrino) and known by a person skilled in the art, and a glass transition temperature Tg in a range of, e.g., about 30 to about 80° C., preferably about 40 to about 70 Tg determined by means of differential scanning calorimetry (DSC) according to ISO 11357-2.

Preferred for this invention are glycidyl-functionalised (meth)acrylic resins with an EEW in the range of about 400 to about 800.

Examples of glycidyl-functionalised (meth)acrylic resins are commercially obtainable resins, such as, for example, WORLÉECRYL® CP 550 (Worlee Chemie GbmH), ALMATEX® PD 7610, ALMATEX® PD 7690 (Siber Hegner GmbH), SYNTHACRYL®710 (Cytec Surface Specialties).

The glycidyl-functionalised (meth)acrylic resins may be partially replaced by further resins such as, for example, diglycidyl ethers of bisphenol, epoxy novolak and other resins containing epoxy groups, in quantities in the range of about 0 to about 10 wt %, based on the total weight of the powder coating composition.

The powder coating composition of this invention comprises, preferably consists of, as component B) one or more cross-linking agent (hardener) for the binder, with quantities in the range of about 30 to about 90 wt %, preferred in a range of about 40 to about 70 wt %, the wt % based on the total weight of the powder coating composition.

The cross-linking agent B) can be hardeners containing carboxyl groups, for example, di- and/or polycarboxylic acids and/or the anhydrides thereof, carboxyl group containing polyesters, carboxyl group containing (meth)acrylates, polyols, hardeners containing amid and/or amino groups. Examples are dicarboxylic acids with a number of carbon atoms in the range of 4 to 20, ADDITIOL® P 791, dicyandiamide and derivatives thereof. Preferred is the use of dicarboxylic acids with a number of carbon atoms in the range of 4 to 20, preferably 10 to 18.

Furthermore, additional hardeners can be used as co-hardener, such as diisocyanates and/or polyisocynates. Examples are aliphatic, cyclo-aliphatic, aromatic diisocyanates and/or polyisocynates as known in the art, for example, hexamethylene diisocyanate (HDI), tetramethylxylylene diisocyanate, isophorone diisocyanate, cyclohexane diisocyanate, toluylene diisocyanate, polyisocyanates which comprise carbodiimide groups, allophanate groups, isocyanurate groups, urethane groups, acylated urea groups and/or biuret groups, polyisocyanates of uretidione and/or isocyanurate type.

The powder coating composition according to the invention comprises, preferably consists of, as component D) a coating additive, and, optionally, a pigment and/or a filler, in quantities in a range of about 0.05 to about 50 wt %, preferably in a range of about 0.1 to about 40 wt %, the wt % based on the total weight of the powder coating composition. A person skilled in the art selects the nature and proportion of such additive, pigment and/or filler for the production of the powder coating composition of the invention.

Coating additives are, for example, degassing auxiliaries, flow-control agents, flatting agents, texturing agents, extenders, photo-initiators, catalysts, dyes, catalysts. For example, flow-control agents can be incorporated in the composition according to the invention via an inorganic carrier or by master-batch techniques known in the art. Compounds having anti-microbial activity may also be used as coating additive in the powder coating composition of the invention. Catalysts can be used to accelerate the cross-linking reaction between component A) and B) of the powder coating composition according to the invention. Such catalysts are, for example, tin salts, phosphides, amines and amides. They may be used, for example, in quantities of 0 to about 5 wt %, based on the total weight of the powder coating composition.

The powder coating composition of this invention may contain, optionally, transparent, color-imparting and/or special effect-imparting pigments and/or fillers. Suitable color-imparting pigments are any conventional coating pigments of an organic or inorganic nature. Examples of inorganic or organic color-imparting pigments are titanium dioxide, micronized titanium dioxide, carbon black, azopigments, and phthalocyanine pigments. Examples of special effect-imparting pigments are metal pigments, for example, made from aluminum, copper or other metals, interference pigments, such as, metal oxide coated metal pigments and coated mica. Examples of usable fillers are silicon dioxide, aluminum silicate, barium sulfate, and calcium carbonate.

The powder coating composition according to this invention may be prepared by conventional manufacturing techniques used in the powder coating industry, such as, extrusion and/or grinding processes, known by a person skilled in the art.

For example, the components can be blended together by dry-blending methods and can be heated to a temperature to melt the mixture, and then the mixture is extruded. The extruded material is then cooled on chill roles, broken up and ground to a fine powder, which can be classified to the desired grain size, for example, to an average particle size of about 20 to about 200 µm.

The composition according to the invention may also be prepared by spraying from supercritical solutions, NAD "non-aqueous dispersion" processes or ultrasonic standing wave atomization process.

Furthermore, specific components of the powder coating composition according to the invention, for example, the particles of component C), and/or the additives, pigments and/or fillers, may be processed with the finished powder coating particles after extrusion and grinding by a "bonding" process using an impact fusion. For this purpose, the specific components may be mixed with the powder coating particles. During blending, the individual powder coating particles are treated to softening their surface so that the components adhere to them and are homogeneously bonded with the surface of the powder coating particles. The softening of the powder particles' surface may be done by heat treating the particles to a temperature, e.g., the glass transition temperature Tg of the composition, in a range of, for example, about 30 to about 60° C. After cooling the mixture the desired average particle size of the resulted particles may be proceed by a sieving process.

The powder coating composition of this invention may be applied by, e.g., electrostatic spraying, thermal or flame spraying, or fluidized bed coating methods, also coil coating techniques, all of which are known as such to those skilled in the art.

The coating composition may be applied to, e.g., metallic substrates, non-metallic substrates, such as, paper, wood, plastics, glass and ceramics, as a one-coating system or as coating layer in a multi-layer film build, in a dry-film thickness in a range of, for example, about 40 to about 100 µm.

The process for the production of the powder coating according to this invention, comprising the steps
 a) applying a transparent clear coat or a pigmented top coat directly onto a substrate surface or onto a prior coating, and
 b) curing the clear coat or the top coat applied in step a), wherein the transparent clear coat or the pigmented top coat comprises a specific powder coating composition.

The powder coating composition according to the invention can be applied as transparent clear coat or pigmented top coat directly onto the substrate surface or onto a prior coating, according to step a).

The prior coating can be a primer which can be a liquid or a powder based primer. The prior coating can also be a coating layer of a multilayer coating system based on liquid or powder coats. For example, the prior coating can be a coating layer of a multilayer coating system based on a powder or liquid clear coat layer applied onto a color-imparting and/or special effect-imparting base coat layer or a pigmented one-layer powder or liquid top coat applied onto a prior coating.

In certain applications, the substrate to be coated may be pre-heated before the application of the powder composition, and then either heated after the application of the powder or not. For example, gas is commonly used for various heating steps, but other methods, e.g., microwaves, IR or NIR are also known.

The curing according to step b) of this invention can be done by thermal energy. The applied coat may, for example, be exposed by convective, gas and/or radiant heating, e.g., infrared (IR) and/or near infrared (NIR) irradiation, as known in the art, to temperatures of, e.g., about 100° C. to about 300° C., preferably of about 120° C. to about 250° C., more preferably of about 120 to about 180° C. (object temperature in each case).

The powder coating composition can also be cured by high energy radiation known by a skilled person. UV (ultraviolet) radiation or electron beam radiation may be used as high-energy radiation. UV-radiation is preferred. Irradiation may proceed continuously or discontinuously.

Dual curing may also be used. Dual curing means a curing method of the powder coating composition according to the invention where the applied composition can be cured, e.g., both by UV irradiation and by thermal curing methods known by a skilled person.

The powder coating compositions according to the invention can be applied directly on the substrate surface or on a layer of a primer which can be a liquid or a powder based primer. The powder coating compositions according to the invention can also be applied as a coating layer of a multilayer coating system based on liquid or powder coats, for example, based on a powder or liquid clear coat layer applied onto a color-imparting and/or special effect-imparting base coat layer or a pigmented one-layer powder or liquid top coat applied onto a prior coating.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A powder coating composition comprising:
   A) about 30 to about 90 wt % of a glycidyl-functionalised (meth)acrylic resin as a film-forming binder,
   B) about 30 to about 90 wt % of a cross-linking agent (hardener) for the binder,
   C) about 0.01 to about 20 wt % of particles chosen from the group comprising aluminium oxide $Al_2O_3$ and aluminium hydroxide Al(OH)3 particles having an average particles size in the range of about 0.1 to about 10 µm, and
   D) about 0.05 to about 50 wt % of a coating additive, and optionally, a pigment and/or a filler,
   the wt % based on the total weight of the powder coating composition.

2. The powder coating composition according to claim 1 wherein the glycidyl-functionalised (meth)acrylic resin A) is produced from monomers glycidyl (meth)acrylate, (meth)acrylic acid esters and styrene derivatives.

3. The powder coating composition according to claim 1 wherein the glycidyl-functionalised (meth)acrylic resin A) has an epoxide equivalent weight (EEW) in the range of about 400 to about 800.

4. The powder coating composition according to claim 1 wherein the cross-linking agent B) comprises a dicarboxylic acid with a number of carbon atoms in the range of 4 to 20.

5. The powder coating composition according to claim 1 wherein the particles of component C) have an average particles size in the range of about 8 to about 10 µm.

6. The powder coating composition according to claim 1 wherein the particles of component C) are aluminium hydroxide Al(OH)3 particles.

7. A process for the production of a scratch resistant powder coating, comprising the steps of:
   a) applying a transparent clear coat or a pigmented top coat directly onto a substrate surface or onto a prior coating, and
   b) curing the clear coat or the top coat applied in step a)
   wherein the transparent clear coat or the pigmented top coat comprises a powder coating composition comprising:
   A) about 30 to about 90 wt % of a glycidyl-functionalised (meth)acrylic resin as a film-forming binder,
   B) about 30 to about 90 wt % of a cross-linking agent (hardener) for the binder,
   C) about 0.01 to about 20 wt % of particles chosen from the group comprising aluminium oxide $Al_2O_3$ and aluminium hydroxide Al(OH)$_3$ particles having an average particles size in the range of about 0.1 to about 10 µm, and
   D) about 0.05 to about 50 wt % of a coating additive, and optionally, a pigment and/or a filler,
   the wt % based on the total weight of the powder coating composition.

8. The process according to claim 7 wherein applying the transparent clear coat or the pigmented top coat directly onto a substrate surface comprises applying the transparent clear coat or the pigmented top coat onto a metallic surface.

9. The process according to claim 7 wherein applying the transparent clear coat or the pigmented top coat onto a prior coating comprises applying the transparent clear coat or the pigmented top coat onto a primer.

10. The process according to claim 7 wherein the glycidyl-functionalised (meth)acrylic resin A) of the powder coating composition is produced from monomers glycidyl (meth)acrylate, (meth)acrylic acid esters and styrene derivatives.

11. The process according to claim 7 wherein the cross-linking agent B) consists of dicarboxylic acids with a number of carbon atoms in the range of 4 to 20.

12. The process according to claim 7 wherein the particles of component C) of the powder coating composition have an average particles size in the range of about 8 to about 10 µm.

13. The process according to claim 7 wherein the particles of component C) of the powder coating composition are aluminium hydroxide Al(OH)$_3$ particles.

* * * * *